United States Patent
Bak et al.

(10) Patent No.: US 10,309,262 B2
(45) Date of Patent: Jun. 4, 2019

(54) COMPLEX SUPERCRITICAL $CO_2$ GENERATION SYSTEM

(71) Applicant: DOOSAN HEAVY INDUSTRIES & CONSTRUCTION CO., LTD, Changwon-si, Gyeongsangnam-do (KR)

(72) Inventors: Byoung Gu Bak, Pohang-si (KR); Seung Gyu Kang, Yongin-si (KR); Jeong Ho Hwang, Yongin-si (KR); Eung Chan Lee, Seoul (KR); Cheol Rae Jeong, Incheon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 90 days.

(21) Appl. No.: 15/698,518

(22) Filed: Sep. 7, 2017

(65) Prior Publication Data

US 2018/0202324 A1    Jul. 19, 2018

(30) Foreign Application Priority Data

Jan. 16, 2017  (KR) .................. 10-2017-0007282
Feb. 1, 2017   (KR) .................. 10-2017-0014370
Feb. 1, 2017   (KR) .................. 10-2017-0014371

(51) Int. Cl.
| *F01K 7/16*  | (2006.01) |
| *F01K 7/32*  | (2006.01) |
| *F02C 1/04*  | (2006.01) |
| *F02C 1/10*  | (2006.01) |
| *F01K 25/10* | (2006.01) |

(52) U.S. Cl.
CPC .............. *F01K 25/103* (2013.01); *F02C 1/04* (2013.01); *F02C 1/10* (2013.01); *F01K 7/16* (2013.01); *F01K 7/32* (2013.01); *F05D 2260/213* (2013.01)

(58) Field of Classification Search
CPC ........... F01K 7/32; F01K 25/10; F01K 25/103
USPC ......................................... 60/647
See application file for complete search history.

(56) References Cited

U.S. PATENT DOCUMENTS

| 7,096,665 B2* | 8/2006 | Stinger ............... F01K 25/08 60/651 |
| 9,624,793 B1* | 4/2017 | Pasch .................. F01K 7/16 |
| 2012/0047892 A1* | 3/2012 | Held .................. F01K 3/185 60/652 |
| 2012/0131921 A1* | 5/2012 | Held .................. F01K 25/08 60/671 |
| 2014/0000261 A1* | 1/2014 | Freund ............... F01K 25/103 60/671 |
| 2014/0102101 A1* | 4/2014 | Xie .................. F01K 25/103 60/647 |

(Continued)

*Primary Examiner* — Laert Dounis
(74) *Attorney, Agent, or Firm* — INVENSTONE Patent, LLC

(57) ABSTRACT

The present invention relates to a complex supercritical $CO_2$ generation system capable of increasing the heat exchange efficiency to improve a system output. According to the present invention, a complex generation system of a bottoming cycle and a topping cycle is configured, a flow rate of a cold side outlet of a bottoming cycle recuperators provided in parallel is branched to be supplied to a recuperator of a topping cycle provided in series, thereby increasing heat exchange efficiency of the topping cycle.

20 Claims, 7 Drawing Sheets

(56) References Cited

U.S. PATENT DOCUMENTS

| | | | |
|---|---|---|---|
| 2015/0240665 A1* | 8/2015 | Stapp | F01K 3/18 60/647 |
| 2016/0010512 A1* | 1/2016 | Close | F01K 11/04 60/651 |
| 2016/0326916 A1* | 11/2016 | Roh | F02C 1/08 |
| 2017/0107860 A1* | 4/2017 | Kim | F01K 7/16 |
| 2017/0114673 A1* | 4/2017 | Kim | F01K 13/00 |
| 2017/0234169 A1* | 8/2017 | Kim | F01K 7/16 60/671 |
| 2017/0234170 A1* | 8/2017 | Kim | F01K 7/16 60/671 |
| 2017/0234266 A1* | 8/2017 | Hwang | F01K 7/16 60/645 |
| 2018/0142581 A1* | 5/2018 | Jeong | F01K 25/103 |

* cited by examiner

COMPLEX SUPERCRITICAL CO₂ GENERATION SYSTEM

CROSS-REFERENCE TO RELATED APPLICATION

This application claims priority to Korean Patent Application Nos. 10-2017-0007282, filed on Jan. 16, 2017, 10-2017-0014370, filed on Feb. 1, 2017, and 10-2017-0014371, filed on Feb. 1, 2017, the disclosure of which is incorporated herein by reference in its entirety.

BACKGROUND

Exemplary embodiments of the present invention relate to a complex supercritical $CO_2$ generation system, and more particularly, to a complex supercritical $CO_2$ generation system capable of increasing heat exchange efficiency to improve a system output.

Internationally, as a necessity for efficient generation is increasing more and more and a movement to reduce pollutant emissions is becoming more and more active, various efforts to increase power production while reducing the pollutant emissions have been conducted. As part of the efforts, research and development into a power generation system using supercritical $CO_2$ as a working fluid has been actively conducted.

The supercritical $CO_2$ has a density similar to a liquid state and viscosity similar to gas, such that equipment may be miniaturized and power consumption required to compress and circulate the fluid may be minimized. At the same time, the supercritical $CO_2$ having critical points of 31.4° C. and 72.8 atm is much lower than water having critical points of 373.95° C. and 271.7 atm, and thus may be handled very easily. The supercritical $CO_2$ generation system shows pure generation efficiency of about 45% when being operated at 550° C. and may improve generation efficiency by 20% or more as compared to that of the existing steam cycle and reduce the size of a turbo device. One example of the supercritical $CO_2$ generation systems is a parallel recuperation type supercritical $CO_2$ generation system disclosed in Korean Patent Application No. 2016-0157112.

FIG. 1 is a schematic diagram showing a cycle of the parallel recuperation type supercritical $CO_2$ generation system. As shown in FIG. 1, the system includes a first separator S1 disposed at a rear end of the compressor 100, in which a working fluid is compressed by the compressor 100 and then branched to a direction 7 of a low temperature heater 330 and a direction 10 of a recuperator unit 200 from the first separator S1. The working fluid branched to the recuperator unit 200 is again branched to a direction 13 of the first recuperator 210 and a direction 11 of a second recuperator 230, respectively, via a second separator S2. The working fluid passing through a first turbine 410 and a second turbine 430 passes through only one of the first recuperator 210 and the second recuperator 230, respectively, and is cooled and then transmitted to the compressor 100.

However, in the existing generation system, since an outlet temperature of the compressor is a value determined in consideration of the efficiency of the compressor, a pressure drop of the recuperator, or the like, the outlet temperature cannot be increased beyond a certain level, which limits an increase in an output of the cycle. Further, since an inlet temperature of the second turbine follows a value slightly lower than an outlet temperature of the first turbine, the higher the highest temperature of the turbine inlet, which is the inlet temperature of the first turbine, the higher the inlet temperature of the second turbine. However, since there is a heat transfer limit in a high temperature heater or a low temperature heater under high temperature conditions of an external heat source (phenomenon that temperature of feed lines 8 and 9 through which the working fluid goes to the high temperature heater 310 via the low temperature heater 330 approaches temperature of B), there is a limit in increasing an output by increasing the inlet temperature of the first turbine.

SUMMARY

A complex supercritical $CO_2$ generation system capable of increasing the heat exchange efficiency to improve a system output and capable of increasing a temperature of a hot side turbine inlet to improve a system output is disclosed.

Other advantages can be understood by the following description, and become apparent with reference to the exemplary embodiments disclosed and can be realized by what is claimed and combinations thereof.

In accordance with one aspect, a complex supercritical $CO_2$ generation system includes a bottoming cycle including a compressor that compresses a working fluid, a plurality of heat exchangers that are supplied with heat from an external heat source to heat the working fluid, a plurality of turbines that are driven by the working fluid, a plurality of recuperators that exchange heat between the working fluid passing through the turbine and the working fluid passing through the compressor to cool the working fluid passing through the turbine and are provided in parallel, and a pre-cooler that cools the working fluid primarily cooled by the recuperators and supplies the cooled working fluid to the compressor, and a topping cycle including a heat exchanger that is supplied with the heat from the external heat source to heat the working fluid, a turbine that is driven by the working fluid, and a plurality of recuperators that exchange heat between the working fluid passing through the turbine and the working fluid supplied from the bottoming cycle to cool the working fluid passing through the turbine and are provided in series, the working fluid cooled by the recuperators being supplied to the bottoming cycle, in which the bottoming cycle and the topping cycle may share the compressor and the pre-cooler of the bottoming cycle.

The bottoming cycle may branch the working fluid at a rear end of the compressor and supply the branched working fluid to the topping cycle and the topping cycle may recuperate the working fluid branched from the bottoming cycle using the recuperators and then supply the recuperated working fluid to the turbine.

Some of the working fluid recuperated by a cold side recuperator among the recuperators of the bottoming cycle may be branched and supplied to the topping cycle, and the topping cycle may recuperate the working fluid branched in the bottoming cycle using the cold side recuperator among the recuperators, mix the recuperated working fluid with the working fluid supplied from the cold side recuperator of the bottoming cycle to the topping cycle, and supply the mixed working fluid to a hot side recuperator among the recuperators.

The working fluid supplied to the hot side recuperator through the cold side recuperator of the topping cycle may be recuperated by the hot side recuperator, reheated by the high temperature heater, and then supplied to the turbine, and the working fluid expanded by passing through the turbine may be cooled by sequentially passing through the hot side recuperator and the cold side recuperator and then supplied to a front end of the pre-cooler of the bottoming cycle.

The heat exchanger of the bottoming cycle may include a low temperature heater and a mid-temperature heater that exchange heat with low temperature and mid-temperature waste heat gases, the heat exchanger of the topping cycle may include a high temperature heater that exchanges heat with high temperature waste heat gas, and the waste heat gas may sequentially pass through the high temperature heater, the mid-temperature heater, and the low temperature heater.

The bottoming cycle may further include a first separator that branches the working fluid compressed by the compressor to the low temperature heater and the recuperators, respectively, a second separator that branches the working fluid branched to the recuperators to the hot side recuperator and the cold side recuperator, respectively, among the recuperators, and a third separator that is provided between the first separator and the compressor to branch the working fluid compressed by the compressor to the topping cycle and the first separator, respectively.

The turbine of the bottoming cycle may include a first turbine and a second turbine, the working fluid recuperated by the hot side recuperator may be supplied to the second turbine, some of the working fluid recuperated by the cold side recuperator may be supplied to the topping cycle and some thereof may be branched again to be supplied to the mid-temperature heater, the working fluid branched to the mid-temperature heater may be mixed with the working fluid heated by the low temperature heater to be supplied to the mid-temperature heater, and the working fluid supplied to the mid-temperature heater may be heated by the mid-temperature heater and then supplied to the first turbine.

The working fluid supplied to the hot side recuperator through the cold side recuperator of the topping cycle may be recuperated by the hot side recuperator, reheated by the high temperature heater, and then supplied to the turbine, and the working fluid expanded by passing through the turbine may be cooled by sequentially passing through the hot side recuperator and the cold side recuperator and then supplied to a front end of the pre-cooler of the bottoming cycle.

The topping cycle may further include a separator that branches some of the working fluid cooled by sequentially passing through the hot side recuperator and the cold side recuperator, a second compressor that compresses the working fluid branched from the separator, and a mixer that is provided at a rear end of the second compressor, and the working fluid branched from the bottoming cycle and supplied to the cold side recuperator of the topping cycle and the working fluid passing through the second compressor may be mixed with each other by the mixer of the topping cycle to be supplied to the hot side recuperator among the recuperators.

The heat exchanger of the bottoming cycle may include a low temperature heater and a mid-temperature heater that exchange heat with low temperature and mid-temperature waste heat gases, the heat exchanger of the topping cycle may include a high temperature heater that exchanges heat with high temperature waste heat gas, and the waste heat gas may sequentially pass through the high temperature heater, the mid-temperature heater, and the low temperature heater.

The bottoming cycle may further include a first separator that branches the working fluid compressed by the compressor to the low temperature heater and the recuperators, respectively, a second separator that branches the working fluid branched to the recuperators to the hot side recuperator and the cold side recuperator, respectively, among the recuperators, and a third separator that is provided between the first separator and the compressor to branch the working fluid compressed by the compressor to the topping cycle and the first separator, respectively.

The turbine of the bottoming cycle may include a first turbine and a second turbine, the working fluid recuperated by the hot side recuperator may be supplied to the second turbine, the working fluid recuperated by the cold side recuperator may be supplied to the mid-temperature heater, the working fluid branched to the mid-temperature heater may be mixed with the working fluid heated by the low temperature heater to be supplied to the mid-temperature heater, and the working fluid supplied to the mid-temperature heater may be heated by the mid-temperature heater and then supplied to the first turbine.

The working fluids expanded by passing through the first and second turbines may be cooled by the hot side and cold side recuperators, respectively, and the working fluids cooled by the hot side and cold side recuperators may be mixed with the working fluid supplied from the topping cycle to be supplied to the pre-cooler.

In accordance with another aspect, a complex supercritical $CO_2$ generation system includes a bottoming cycle including a plurality of compressors that compress a working fluid, a plurality of heat exchangers that are supplied with heat from an external heat source to heat the working fluid, a plurality of turbines that are driven by the working fluid, a plurality of recuperators that exchange heat between the working fluid passing through the turbine and the working fluid passing through the compressor to cool the working fluid passing through the turbine and are provided in parallel, and a plurality of pre-coolers that cool the working fluid primarily cooled by the recuperators and supply the cooled working fluid to the compressor, and a topping cycle including a heat exchanger that is supplied with the heat from the external heat source to heat the working fluid, a turbine that is driven by the working fluid, and a plurality of recuperators that exchange heat between the working fluid passing through the turbine and the working fluid supplied from the bottoming cycle to cool the working fluid passing through the turbine and are provided in series, the working fluid cooled by the recuperator being supplied to the bottoming cycle, in which the bottoming cycle and the topping cycle may share the compressor and the pre-cooler of the bottoming cycle.

The bottoming cycle may branch the working fluid at a rear end of the compressor and supply the branched working fluid to the topping cycle, the topping cycle may recuperate the working fluid branched from the bottoming cycle using the recuperators and then supply the recuperated working fluid to the turbine, the heat exchanger of the bottoming cycle may include first to third heaters that exchange heat with low temperature and mid-temperature waste heat gases, the heat exchanger of the topping cycle may include a high temperature heater that exchanges heat with high temperature waste heat gas, and the waste heat gas may sequentially pass through the high temperature heater and the first to third heaters.

The topping cycle may further include a mixer to which some of the working fluid branched from any one of the recuperators of the bottoming cycle is supplied, the working fluid branched to the mixer may be mixed with the working fluid recuperated by the cold side recuperator of the recuperators, recuperated by a hot side recuperator among the recuperators, reheated by the high temperature heater, and then supplied to the turbine, the topping cycle may sequentially pass the working fluid, which is expanded by passing through the turbine, through the hot side recuperator and the cold side recuperator and cool the working fluid and then supply the cooled working fluid to a front end of the pre-cooler of the bottoming cycle.

The compressor of the bottoming cycle may include a first compressor and a second compressor, the pre-cooler may include a first pre-cooler and a second pre-cooler, the working fluid supplied from the topping cycle may be mixed by a mixer provided at a rear end of the second pre-cooler to be supplied to the second pre-cooler, and the working fluid branched at a discharge end of the second pre-cooler may be supplied to the first pre-cooler and the second compressor.

The bottoming cycle may include first to third recuperators, the working fluid compressed by the second compressor may be supplied to the third heater, the working fluid heated by the third heater may be mixed with the working fluid recuperated by the third recuperator to be supplied to the second heater, the working fluid heated by the second heater may be mixed with some of the working fluid recuperated by the second recuperator to be supplied to the first heater, and then heated by the first heater to be supplied to a hot side turbine among the turbines.

The bottoming cycle may further include a first separator that branches the working fluid compressed by the first compressor to the first recuperator and the second recuperator, respectively, a second separator that branches the working fluid branched to the second recuperator to the second recuperator and the third recuperators, respectively, and a third separator that is provided between the first separator and the compressor to branch the working fluid passing through the first compressor to the topping cycle and the first separator, respectively.

The turbine of the bottoming cycle may include a first to third turbines, the working fluid recuperated by the first recuperator may be supplied to the second turbine, some of the working fluid recuperated by the second recuperator may be supplied to the topping cycle and some thereof may be again branched to be supplied to the second heater and the third turbine, respectively, the working fluid recuperated by the third recuperator may be supplied to the third heater to be mixed with the working fluid passing through the third heater, the working fluids expanded by passing through the first to third turbines may be cooled by the first to third recuperators, respectively, the working fluids cooled by the first to third recuperators mixed with each other may be mixed with the working fluid supplied from the topping cycle to be supplied to the second pre-cooler.

BRIEF DESCRIPTION OF THE DRAWINGS

The above and other objects, features and other advantages will be more clearly understood from the following detailed description taken in conjunction with the accompanying drawings, in which.

DETAILED DESCRIPTION

Hereinafter, a complex supercritical $CO_2$ generation system according to exemplary embodiments will be described in detail with reference to the accompanying drawings.

Generally, the supercritical $CO_2$ generation system configures a closed cycle in which $CO_2$ used for generation is not emitted to the outside, and uses supercritical $CO_2$ as a working fluid. The supercritical $CO_2$ generation system uses supercritical $CO_2$ as a working fluid, and therefore may use exhaust gas discharged from a thermal power plant, etc. Accordingly, the supercritical $CO_2$ generation system may not only be used as a single generation system, but also be used for a hybrid generation system with the thermal generation system. The working fluid of the supercritical $CO_2$ generation system may also supply $CO_2$ separated from the exhaust gas and may also supply separate $CO_2$.

The supercritical $CO_2$ (hereinafter, working fluid) in a cycle passes through a compressor, and then becomes a high temperature high pressure working fluid while passing through a heat source such as a heater, thereby operating a turbine. A generator or a pump is connected to the turbine where the turbine connected to the generator produces power and the turbine connected to the pump operates the pump. The working fluid passing through the turbine is cooled while passing through a heat exchanger and the cooled working fluid is again supplied to the compressor to be circulated within the cycle. The turbine or the heat exchanger may be provided in plural.

The supercritical $CO_2$ generation system according to various exemplary embodiments refers to a system where all the working fluids flowing within the cycle are in the supercritical state and a system where most of the working fluids are in the supercritical state and the rest of the working fluids are in a subcritical state.

Further, in various exemplary embodiments, the $CO_2$ is used as the working fluid. Here, $CO_2$ refers to pure carbon dioxide in a chemical meaning and carbon dioxide including some impurities and even a fluid in which carbon dioxide is mixed with one or more fluids as additives in general terms.

It is to be noted that terms "low temperature" and "high temperature" have relative meanings, and thus should not be understood as being a temperature higher or lower than a specific reference temperature.

Figure 1:
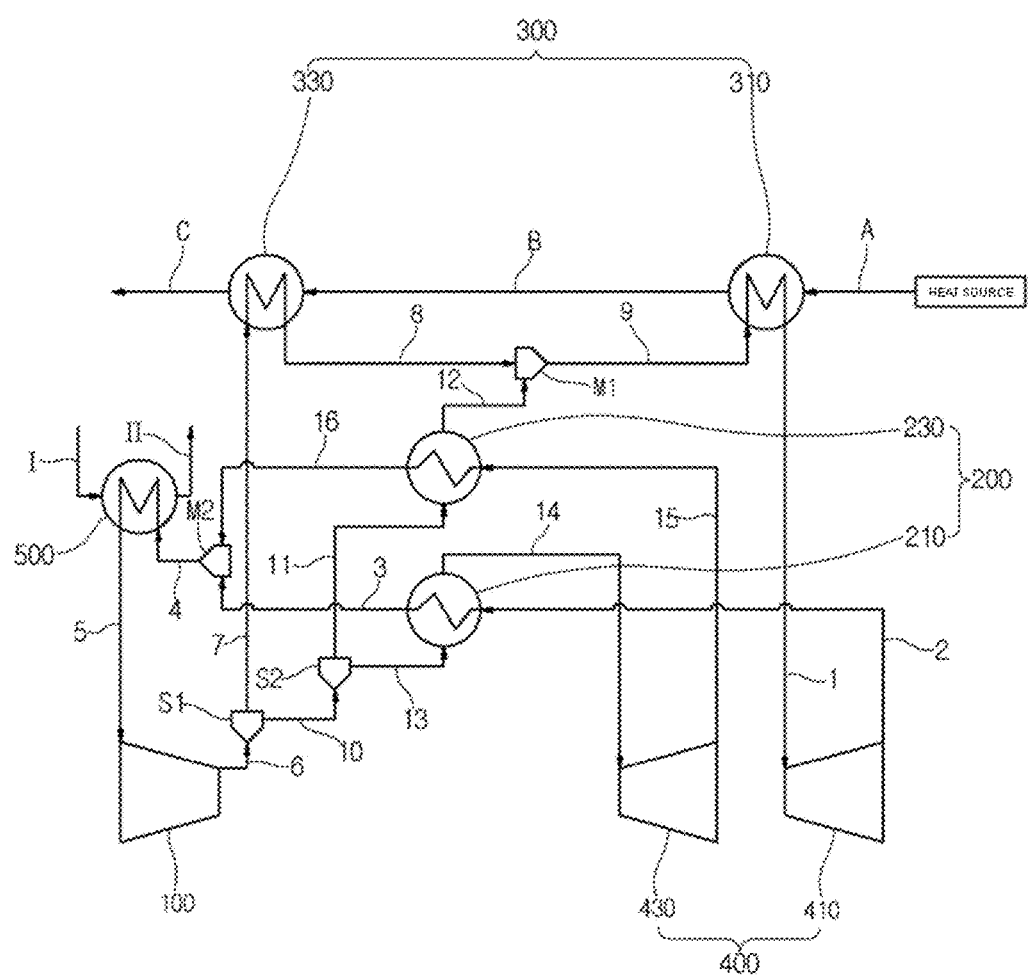
FIG. 1 is a schematic diagram showing a cycle of the existing parallel recuperation type supercritical $CO_2$ generation system.
Figure 2:
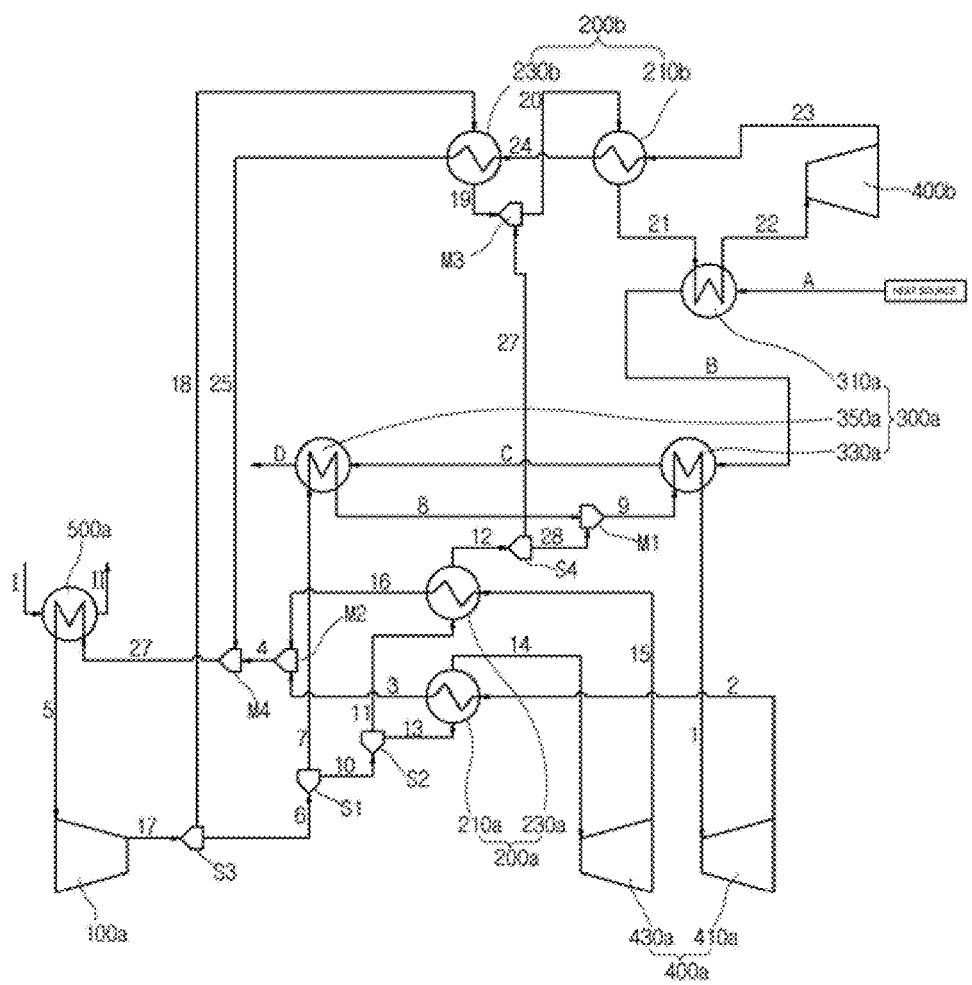
FIG. 2 is a schematic diagram showing a cycle of a complex supercritical $CO_2$ generation system according to an exemplary embodiment.

FIG. 2 is a schematic diagram showing a cycle of a complex supercritical $CO_2$ generation system according to an exemplary embodiment. A complex generation system in which a parallel recuperation type supercritical $CO_2$ generation system of FIG. 1 is configured as a bottoming cycle and a serial recuperation type supercritical $CO_2$ generation cycle is configured as a topping cycle. The complex generation system of the present disclosure uses supercritical $CO_2$ as a working fluid to construct a single phase generation system. However, a liquid-phase working fluid may flow at a rear end of the pre-cooler to be described later, and two-phase flowing of a liquid-phase and gas-phase working fluid may occur inside the pre-cooler.

First, the bottoming cycle will be described as follows. Referring to FIG. 2, the generation cycle includes a turbine unit 400a including two turbines 410a and 430a for producing electric power, a pre-cooler 500a for cooling a working fluid, and a compressor 100a for increasing pressure of the cooled working fluid, thereby forming a low temperature high pressure working fluid condition. In addition, two waste heat recovery heat exchangers 330a and 350a of a heat exchanger unit 300a for effective waste heat recovery are provided and a first recuperator unit 200a including two recuperators 210a and 230a for heat exchange of the working fluid are provided. The waste heat recovery heat exchangers 330a and 350a is provided in series, the recuperators in the first recuperator unit 200a is provided in parallel, and a plurality of separators and mixers for distributing a flow rate of the working fluid are provided.

The compressor 100a compresses the working fluid cooled by the pre-cooler 500a, and the compressed working fluid becomes a working fluid having a temperature and a pressure higher than immediately after passing through the pre-cooler 500a. Some of the working fluid compressed by the compressor 100a is branched to the topping cycle to be described later, and the rest thereof is branched to the first recuperator unit 200a.

The first recuperator unit 200a is configured to include a first recuperator 210a and a second recuperator 230a, and the turbine unit 400a is configured to include a first turbine 410a and a second turbine 430a. The working fluid compressed by the compressor 100a is branched and supplied to the first recuperator 210a and the second recuperator 230a, respectively, and exchanges heat with a working fluid passing through the turbine unit 400a to be recuperated, in which the working fluid passing through the turbine unit 400a is cooled. The working fluid recuperated by the first recuperator 210a is supplied to the second turbine 430a. Some of the working fluid recuperated by the second recuperator 230a is branched and supplied to the topping cycle, and the rest thereof is branched to the heat exchanger unit 300a.

The heat exchanger unit 300a is configured to include a middle-temperature heater 330a and a low temperature heater 350a, and is an external heat exchanger that heats a working fluid using a heat source like waste heat outside a cycle along with the high temperature heater 310a of the topping cycle to be later. The heat exchanger unit 300a uses, as a heat source, gas (hereinafter, waste heat gas) having waste heat such as exhaust gas emitted from a boiler of a power plant, and serves to exchange heat between the waste heat gas and the working fluid circulating inside the cycle to heat the working fluid with the heat supplied from the waste heat gas. As the heat exchanger approaches the external heat source, the heat exchange is made at a higher temperature, and as the heat exchanger approaches an outlet end through which the waste heat gas is discharged, the heat exchange is made at a low temperature. The heat exchanger unit 300a for exchanging heat with the waste heat gas having the highest temperature is the high temperature heater 310a to be described later and the heat exchanger unit 300a for exchanging heat with the waste heat gas having the lowest temperature is the low temperature heater 350a. That is, the order according to closeness to the heat source is the high temperature heater 310a—the mid-temperature heater 330a—the low temperature heater 350a.

Separators in the exemplary embodiment includes a first separator S1 to a fourth separator S4. Mixers in the exemplary embodiment includes a first mixer M1 to a fourth mixer M4.

The first separator S1 is provided at a rear end of the compressor 100a. The third separator S3 is provided between the first separator S1 and the compressor 100a such that the working fluid branched from the third separator S3 is supplied to the topping cycle and the first separator S1, respectively. At the first separator S1, the working fluid is branched into the low temperature heater 350a and the second separator S2. At the second separator S2, the working fluid is branched to the first recuperator 210a and the second recuperator 230a, respectively. The fourth separator S4 is provided at the rear end of the second recuperator 230a, and some of the working fluid is branched to the mixer provided in the topping cycle and the rest thereof is transmitted toward the mid-temperature heater 330a.

The first mixer M1 mixes the working fluid heated by the low temperature heater 350a and the working fluid recuperated by the second recuperator 230a. The mixed working fluid is supplied to the med-temperature heater 330a and heated, and then supplied to the first turbine 410a. The second mixer M2 is connected to the outlet ends of the first and second recuperators 210a and 230a and mixes the working fluids cooled by the first and second recuperators 210a and 230a from the turbine unit 400a. The third mixer M3 is provided in the topping cycle to mix the working fluid branched from the third separator S3 with the working fluid of the topping cycle. The fourth mixer M4 is provided between an inlet end of the pre-cooler 500a and the second mixer M2, and mixes the working fluid mixed by the second mixer M2 with the working fluid supplied in the topping cycle. The working fluid mixed by the fourth mixer M4 corresponds to the total flow rate of the working fluids of the topping cycle and the bottoming cycle, and the mixed working fluid is supplied to the pre-cooler 500a.

The flow of the working fluid in the generation system having the above-described configuration will be briefly described. The total flow rate through transfer pipe 4 of working fluid of the bottoming cycle and the total flow rate through transfer pipe 25 of working fluid of the topping cycle are collected in and mixed by the fourth mixer M4 and then are introduced into the pre-cooler 500a through transfer pipe 27. The working fluid once cooled by the pre-cooler 500a is supplied to and compressed by the compressor 100a via transfer pipe 5.

The working fluid compressed by the compressor 100a is supplied to the third separator S3 via transfer pipe 17. A part thereof is branched to the topping cycle via transfer pipe 18 and the rest thereof is supplied to the first separator S1 via transfer pipe 6.

The working fluid is branched from the first separator S1 to the low temperature heater 350a via transfer pipe 7 and the second separator S2 via transfer pipe 10. The working fluid branched to the second separator S2 is branched to the first recuperator 210a via transfer pipe 13 and the second recuperator 230a via transfer pipe 11. The working fluid branched to the first recuperator 210a via transfer pipe 13 exchanges heat with the working fluid passing through the first turbine 410a to absorb heat, and thus is recuperated. The working fluid recuperated enough to drive the turbine is supplied to the second turbine 430*a* via transfer pipe 14 to drive the second turbine 430*a*. The second turbine 430*a* may be connected to the compressor 100*a* to produce a driving force for driving the compressor 100*a*.

The working fluid branched to the second recuperator 230*a* via transfer pipe 11 exchanges heat with the working fluid passing through the second turbine 430*a* to absorb heat, and thus is recuperated. The working fluid recuperated by the second recuperator 230*a* is supplied to the fourth separator S4 via transfer pipe 12, and some of the working fluid is supplied from the fourth separator S4 to the third mixer M3 of the topping cycle via transfer pipe 27 and a part thereof is branched to the first mixer M1 via transfer pipe 28.

The working fluid branched to the first mixer M1 is mixed with the working fluid 8 heated by the low temperature heater 350*a* and transmitted to the intermediate temperature heater 330*a* via transfer pipe 9. The working fluid recuperated enough to drive the turbine is supplied to the first turbine 410*a* to drive the first turbine 410*a*. A generator may be connected to the first turbine 410*a* to produce electric power.

After the plurality of turbines in turbine unit 400*a* are driven, the expanded working fluid is transmitted to the first recuperator unit 200*a* and cooled. The working fluid passing through the first turbine 410*a* is transmitted to the first recuperator 210*a* via transfer pipe 2.

In each recuperator of the first recuperator unit 200*a*, the working fluid compressed by the compressor 100*a* and the working fluid passing through the turbine unit 400*a* exchange heat with each other, and thus the working fluid passing through the turbine unit 400*a* is cooled and then collected in and mixed by the second mixer M2 via transfer pipes 3 and 16. The working fluid mixed by the second mixer M2 is transmitted to the fourth mixer M4 via transfer pipe 4 and mixed with the working fluid transmitted from the topping cycle via transfer pipe 26 to be supplied to the pre-cooler 500*a* via transfer pipe 27. The flow rate of the working fluid mixed by the fourth mixer M4 becomes the total flow rate of the bottoming cycle and the topping cycle.

Hereinafter, the topping cycle constructed by combining with the bottoming cycle will be described. The topping cycle of the present disclosure is configured to include two recuperators, the high temperature heater 310*a* for recovering waste heat from an external heat source, and a third turbine 400*b*. The recuperators in the second recuperator unit 200*b* is configured to include a third recuperator 210*b* and a fourth recuperator 230*b*, and is provided in series.

Describing with reference to the flow of the working fluid, some of the working fluid of the bottoming cycle is supplied to the fourth recuperator 230*b* through the third separator S3 via transfer pipe 18. The working fluid is recuperated by the fourth recuperator 230*b* and then transmitted to the third mixer M3 via transfer pipe 19. The third mixer M3 mixes the working fluid recuperated by the fourth recuperator 230*b* with the working fluid branched from the fourth separator S4 and supplies the mixed working fluid to the third recuperator 210*b* via transfer pipe 20.

In the case of the heat exchanger like the recuperator, a cold side inlet refers to a side into which the working fluid that is cooled by passing through the pre-cooler and then compressed through the compressor is introduced, and a cold side outlet is a side to which the introduced working fluid is discharged. Conversely, a hot side inlet refers to a side into which the working fluid expanded by passing through the turbine is introduced, and a hot side outlet refers to a side to which the expanded working fluid is cooled by exchanging heat with the working fluid passing through the compressor and then is discharged. This is a classification according to the relative temperature of the working fluid entering and exiting the recuperator.

The temperatures of the cold side and hot side inlets and outlets of the second to fourth recuperators will be described as follows (each inlet/outlet is indicated by numbers of the transfer pipe). If a compressor is further provided in the topping cycle at a position between transfer pipe 28 and the third mixer, for example, the flow rate of the working fluid is not increased, and the working fluid introduced into the fourth recuperator 230*b* may be supplied 56° C., for example. The temperature of the cold side outlet exiting the fourth recuperator 230*b* after the heat exchange may be about 190° C., for example. Then, the working fluid of 190° C. mixed with the working fluid of 190° C. passing through the additional compressor may be supplied to the third recuperator 210*b*, the temperature of the cold side inlet corresponding to transfer pipe 20. The temperature of the working fluid supplied to the third recuperator 210*b* via the third turbine 400*b* may be about 424° C., for example, the temperature of the hot side inlet corresponding to transfer pipe 23, and the temperature of the hot side outlet, which is cooled after the heat exchange in the third recuperator 210*b*, may be about 195° C., for example, the temperature corresponding to transfer pipe 24. The working fluid supplied at 190° C. may be discharged at about 382° C. after being recuperated by exchanging heat with the working fluid passing through the third turbine 400*b* from the third recuperator 210*b*, the temperature of the cold side outlet corresponding to transfer pipe 21.

According to the present disclosure in which the flow rate of the working fluid is branched from the second recuperator 230*a* of the bottoming cycle without the additional compressor and is supplied to the third mixer M3, the temperature of the cold side inlet at transfer pipe 11 of the second recuperator 230*a* in the bottoming cycle may be about 56° C., for example, and the temperature of the hot side inlet at transfer pipe 15 may be about 270° C., for example. The temperature of the cold side outlet at transfer pipe 12 through which the working fluid passing through the second separator S2 exits after exchanging heat with the working fluid passing through the second turbine 430*a* may be about 265° C., for example, and the temperature of the hot side outlet at transfer pipe 16 through which the working fluid passing through the second turbine 430*a* is cooled after exchanging heat with the working fluid passing through the second separator 230*a* and exits may be about 62° C., for example.

Some of the working fluid compressed by the compressor 100*a* is supplied to the fourth recuperator 230*b* so that the temperature of the cold side inlet at transfer pipe 18 is about 56° C., for example, and the temperature of the cold side outlet at transfer pipe 19 through which the working fluid exits after the heat exchange may be about 265° C., for example. Since the temperature of the working fluid supplied to the third mixer M3 is also about 265° C., the temperature of the cold side inlet at transfer pipe 20 introduced into the third recuperator 210*b* is about 265° C., for example. The temperature of the hot side inlet at transfer pipe 23 of the third recuperator 210*b* into which the working fluid passing through the third turbine 400*b* is introduced may be about 424° C., for example, and the temperature of the cold side outlet at transfer pipe 21 of the third recuperator 210*b* through which the working fluid exits to the high temperature heater 310*a* after exchanging heat with the working fluid passing through the third turbine 400*b* may be about 401° C., for example.

As described above, instead of providing an additional compressor, the flow rate of the cold side outlet of the second recuperator 230a is partially branched and supplied to the third mixer M3, thereby supplying the working fluid having the same temperature as the working fluid recuperated by the fourth recuperator 230b. Therefore, a small flow rate of working fluid may be recuperated by the fourth recuperator 230b, mixed with the working fluid having the same temperature, and then supplied to the third recuperator 210b. Since the temperature of the working fluid introduced into the third recuperator 210b is higher as compared with the case in which the additional compressor is provided, the heat exchange efficiency of the third recuperator 210b can be increased.

The working fluid is recuperated by the third recuperator 210b, supplied to the high temperature heater 310a, and then reheated via transfer pipe 21. The high temperature heater 310a absorbs heat from the waste heat gas and exchanges heat with the working fluid via transfer pipe A and is disposed closest to the external heat source. High temperature waste heat gas is used. After the waste heat gas is primarily absorbed by the high temperature heater 310a and thus the temperature thereof is gradually reduced, the waste heat gas is sequentially supplied to the mid-temperature heater 330a and the low temperature heater 350a within the bottoming cycle via transfer pipes B and C, respectively. In the viewpoint of the waste heat recovery heater, two cycles are connected in series.

The working fluid sufficiently heated by the high temperature heater 310a is supplied to the third turbine 400b via transfer pipe 22 to drive the third turbine 400b and an additional generator (not shown) may be connected to the third turbine 400b. The working fluid expanded by passing through the third turbine 400b is supplied to the third recuperator 210b via transfer pipe 23 and exchanges heat with the working fluid passing through the third mixer M3 to be cooled. Thereafter, the working fluid is supplied to the fourth recuperator 230b via transfer pipe 24 and exchanges heat with the working fluid branched from the third separator S3 to be cooled, and then transmitted to the fourth separator S4 via transfer pipe 25. The fourth mixer M4 configures a complex generation cycle in which the working fluid of the bottoming cycle and the working fluid of the topping cycle are mixed with each other and circulated back to the pre-cooler 500a again.

In the complex supercritical $CO_2$ generation system according to the exemplary embodiment having the above-described configuration, comparison results of the complex generation cycle shown in FIG. 2 with the existing cycle shown in FIG. 1 are as described follows.

Figure 3:
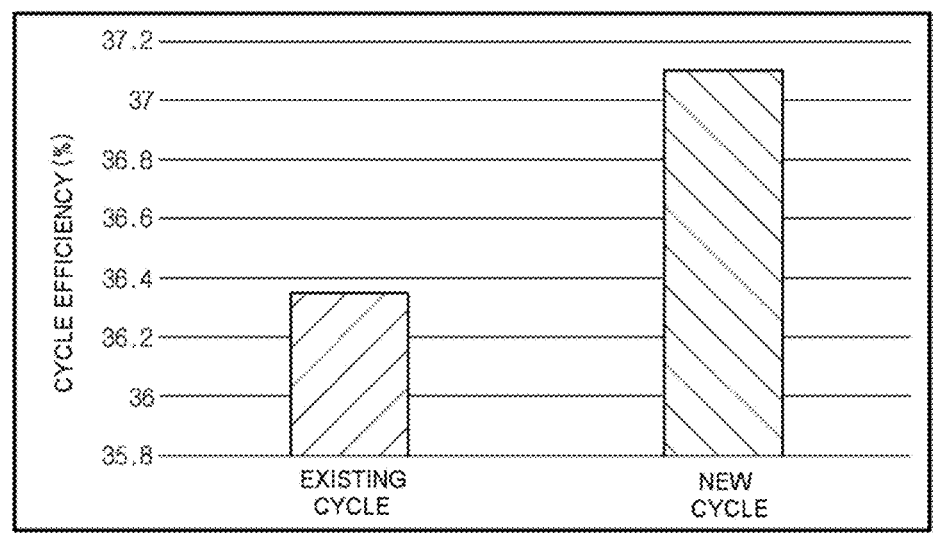
FIG. 3 is a graph showing generation efficiency of the existing parallel recuperation cycle and a complex generation cycle of the present disclosure.
Figure 4:
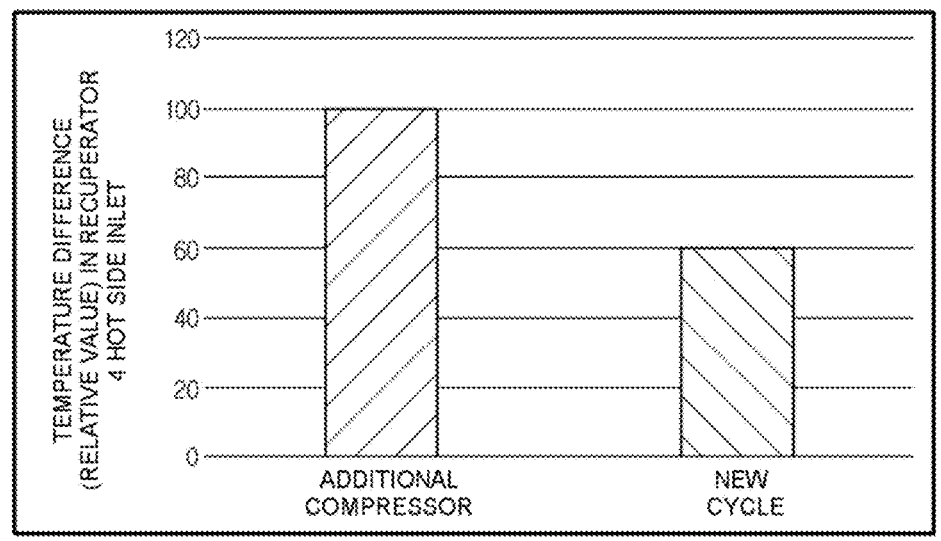
FIG. 4 is a graph showing a temperature difference between a hot side inlet of a third recuperator when a re-compressor is provided in a topping cycle and the hot side inlet of the third recuperator when the re-compressor is removed from the topping cycle.

FIG. 3 is a graph showing generation efficiency of the existing parallel recuperation cycle and a complex generation cycle of the present disclosure. FIG. 4 is a graph showing a difference between a hot side inlet of a third recuperator when a re-compressor is provided in a topping cycle and the hot side inlet of the third recuperator when the re-compressor is removed from the topping cycle, where the comparison is made in a state in which a total heat input of the waste heat recovery heater is fixed.

As shown in FIG. 3, as compared with the total efficiency of the existing cycle, it can be seen that the generation efficiency of the complex generation cycle is increased by about 0.75%. This means that a cycle having a high output can be designed under the same heat source conditions.

Further, as shown in FIG. 4, when the compressor is added to the topping cycle and some of the working fluid of the cold side outlet of the second recuperator 230a is branched without the additional compressor and supplied to the topping cycle, it can be seen that a temperature difference obtained by subtracting the temperature of the transfer pipe 21 from the temperature of the transfer pipe 23 in the hot side inlet of the third recuperator 210b is reduced. If the case where the additional compressor is provided is assumed to be 100%, the temperature difference in the hot side inlet of the third recuperator 210b is reduced to 60% when a flow rate distribution is made without the additional compressor, such that it can be seen that the heat exchange of the third recuperator 210b is made more efficient. Therefore, the improvement in the heat exchange efficiency contributes to the improvement in the efficiency of the whole cycle.

As described above, the complex generation system of the bottoming cycle and the topping cycle is configured such that the flow rate of the cold side outlet of the bottoming cycle recuperators provided in parallel is branched to be supplied to the recuperators of the topping cycle provided in series, thereby increasing the heat exchange efficiency of the topping cycle. Therefore, it is possible to increase the efficiency of the whole cycle. On the other hand, the complex supercritical $CO_2$ generation system of FIG. 2 adds a compressor to the topping cycle to increase the temperature of the hot side turbine inlet, thereby increasing the system output.

Hereinafter, a complex supercritical $CO_2$ generation system according to another exemplary embodiment will be described. The detailed description of the same components as those in the above exemplary embodiment will not be described again, and the same components are denoted by the same reference numerals but shall be distinguished by a prime (') symbol.

Figure 5:
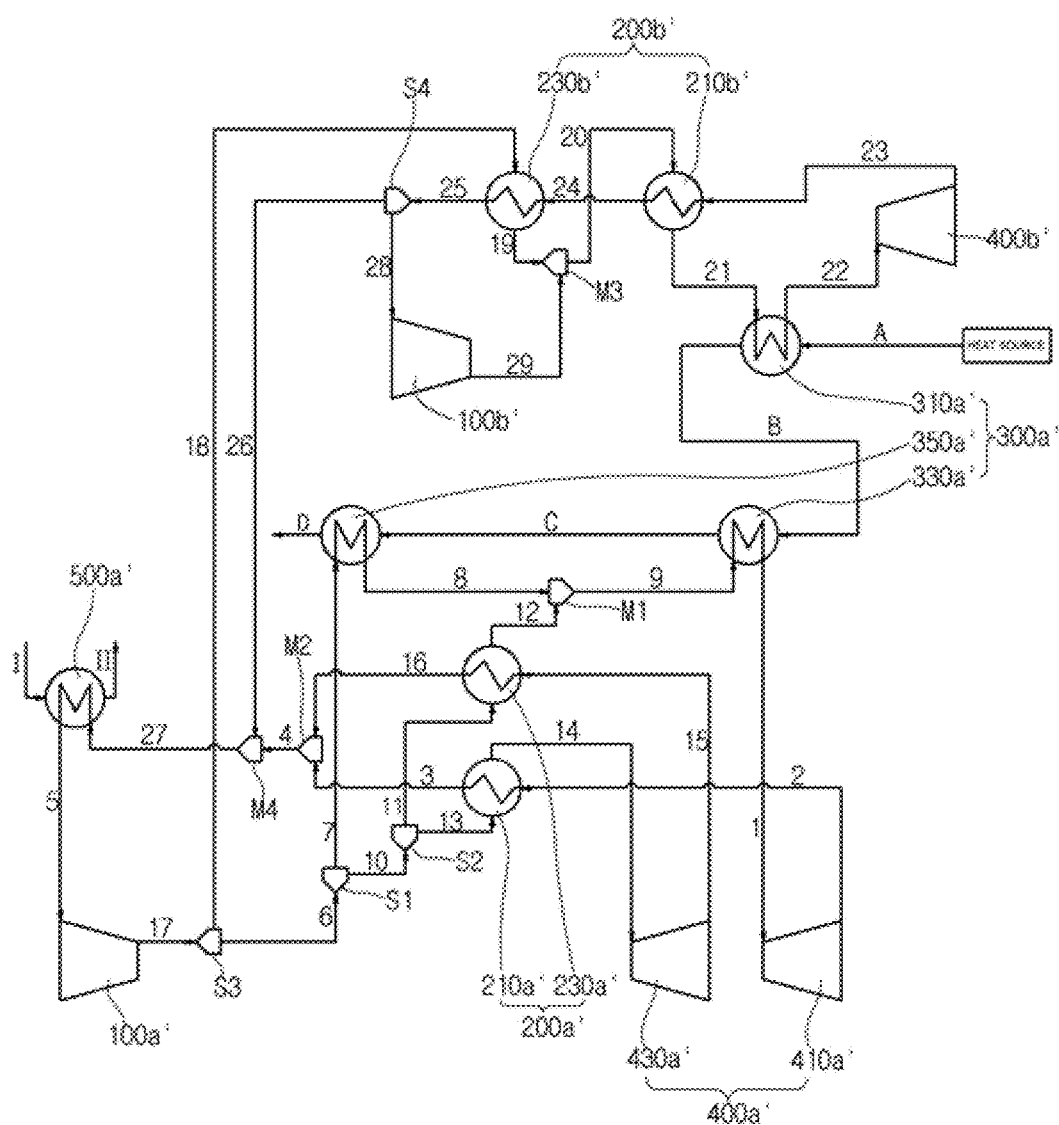
FIG. 5 is a schematic diagram showing a cycle of a complex supercritical $CO_2$ generation system according to another exemplary embodiment.

FIG. 5 is a schematic diagram showing a cycle of a complex supercritical $CO_2$ generation system according to another exemplary embodiment in which the parallel recuperation type supercritical $CO_2$ generation system of FIG. 1 is configured as a bottoming cycle and the recompression cycle is configured as a topping cycle.

The bottoming cycle includes a turbine unit 400a' including two turbines 410a' and 430a' for producing electric power, a pre-cooler 500a' for cooling a working fluid, and a compressor 100a' for increasing a pressure of the cooled working fluid, thereby forming a low-temperature high pressure working fluid condition. The first turbine 410a' is a high pressure side turbine and the second turbine 430a' is a low pressure side turbine. A generator (not shown) is coupled to the first turbine 410a' to be supplied with a driving force of the first turbine 410a' to produce power, and the second turbine 430a' may be used to drive the first compressor 100a'. In addition, two waste heat recovery heat exchangers 330a' and 350a' of a heat exchanger unit 300a' (hereinafter, low temperature heater 350a' and mid-temperature heater 330a') for effective waste heat recovery are provided and a first recuperator unit 200a' including two recuperators 210a' and 230a' for heat exchange of the working fluid are provided. Among the recuperators 200a', a hot side recuperator is a side to which the working fluid discharged from the high pressure side turbine 410a' is supplied, and a cold side recuperator is a side to which the working fluid discharged from the low pressure side turbine is supplied. The waste heat recovery heat exchangers 330a' and 350a' are provided in series, the recuperators in the first recuperator unit 200a' are provided in parallel, and a plurality of separators and mixers for distributing a flow rate of the working fluid are provided.

The first separator S1 is provided at the rear end of the first compressor 100a' and the second separator S2 is provided on the transfer pipe 10 branched from the first separator S1 to the first recuperator unit 200a'. The first mixer M1 is provided between the low temperature heater 350a' and the mid-temperature heater 330a', and the second mixer M2 is provided to connect between the rear end of the first turbine 410a' and the second turbine 430a' (the flow of the working fluid is the same as that of the bottoming cycle of FIG. 2, and thus a detailed description thereof is omitted for convenience).

In the topping cycle of FIG. 5, the third separator S3 and a fourth mixer M4 are added to the parallel complex system, with the recompression cycle being added to the parallel complex generation cycle. The third separator S3 is provided at the rear end of the first compressor 100a' and is provided at the front end of the first separator S1, and the fourth mixer M4 is provided between the second mixer M2 and the pre-cooler 500a'. They will be described below. Also, the parallel complex generation cycle and the recompression cycle share the pre-cooler 500a' and the first compressor 100a'.

The recompression cycle according to the complex supercritical generation system of the present disclosure is configured to include a second compressor 100b', a second recuperator unit 200b' including two recuperators 210b' and 230b', a high temperature heater 310a' for recovering waste heat from an external heat source, and a third turbine 400b'. The second compressor 100b' may be regarded as a re-compressor that is supplied with some of the working fluid once compressed by the first compressor 100a' to once more compress the working fluid circulating the cycle to thereby recompress the working fluid.

Some of the working fluid compressed by the first compressor 100a' is supplied to a fourth recuperator 230b' through the third separator S3 via transfer pipe 18, and the working fluid is recuperated by the fourth recuperator 230b' and then transmitted to the third mixer M3 via transfer pipe 19. The third mixer M3 mixes the working fluid passing through the fourth recuperator 230b' and the second compressor 100b' and supplies the mixed working fluid to a third recuperator 210b' via transfer pipe 20. The working fluid is recuperated by the third recuperator 210b', supplied to the high temperature heater 310a' via transfer pipe 21, and then reheated.

The high temperature heater 310a' absorbs heat from the waste heat gas and exchanges heat with the working fluid via transfer pipe A and is disposed closest to the external heat source. High temperature waste heat gas is used. After the waste heat gas is primarily absorbed by the high temperature heater 310a' and thus the temperature thereof is gradually reduced, the waste heat gas is sequentially supplied to the mid-temperature heater 330a' and the low temperature heater 350a' via transfer pipes B and C, respectively, within the parallel recuperation cycle as described above. In the viewpoint of the waste heat recovery heater, two cycles are connected in series.

The working fluid sufficiently heated by the high temperature heater 310a' is supplied to the third turbine 400b' via transfer pipe 22 to drive the third turbine 400b' and an additional generator (not shown) may be connected to the third turbine 400b'. The working fluid expanded by passing through the third turbine 400b' is supplied to the third recuperator 210b' via transfer pipe 23 and exchanges heat with the working fluid passing through the second compressor 100b' to be cooled. Thereafter, the working fluid is supplied to the fourth recuperator 230b' via transfer pipe 24 and exchanges heat with the working fluid branched from the third separator S3 to be cooled, and then transmitted to the fourth separator S4 via transfer pipe 25. Some of the working fluid is branched from the fourth separator S4 and supplied to the fourth mixer M4 of the parallel recuperation cycle via transfer pipe 26, and the rest thereof is supplied to the second compressor 100b' via transfer pipe 28.

In the complex supercritical $CO_2$ generation system according to the exemplary embodiment having the above-described configuration, the comparison results of the complex generation cycle of the present disclosure shown in FIG. 5 with the existing cycle shown in FIG. 1 are as follows.

Figure 6:
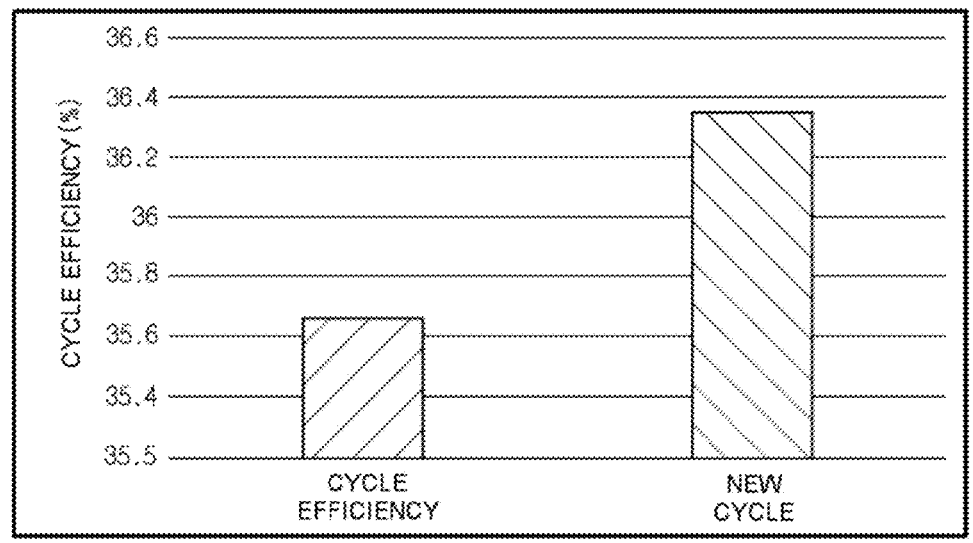
FIG. 6 is a graph showing generation efficiency of the existing parallel recuperation cycle and a complex generation cycle of the present disclosure.
Figure 7:
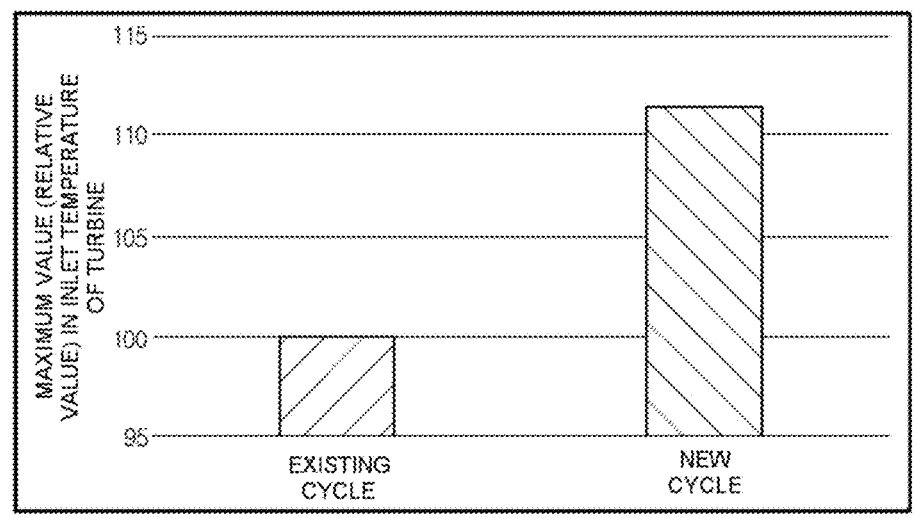
FIG. 7 is a comparison graph of an inlet temperature of a first turbine of the existing parallel recuperation cycle with an inlet temperature of a first turbine of the complex generation cycle of the present disclosure.

FIG. 6 is a graph showing generation efficiency of the existing parallel recuperation cycle and a complex generation cycle of the present disclosure. FIG. 7 is a comparison graph of a temperature of a first turbine inlet of the existing parallel recuperation cycle with a temperature of a first turbine inlet of the complex generation cycle of the present disclosure. The comparison is made in a state in which the total heat input of the waste heat recovery heater is fixed.

As shown in FIG. 6, as compared with the total efficiency of the existing cycle, it can be seen that the generation efficiency of the complex generation cycle of the present disclosure is increased by about 0.68%. This means that a cycle having a high output can be designed under the same heat source conditions.

As shown in FIG. 7, the above-mentioned efficiency improvement of the whole cycle can be described by the temperature difference in the turbine inlets of two cycles. Referring to FIG. 7, it can be seen that the maximum value of the inlet temperature of the third turbine 400b' of the generation cycle of the present disclosure is about 11% higher than that of the existing cycle. That is, the existing cycle has a limit of increasing the inlet temperature of the turbine (first turbine), but if the complex cycle includes the recompression cycle as in the complex cycle of the present disclosure, the maximum value of the inlet temperature of the turbine can be increased.

As described above, the cycle is configured so that the highest temperature portion of the external heat source is used in the recompression cycle and then the heat source discharged in the low temperature state is used in the existing parallel recuperation generation system. Thus, the highest inlet temperature of the hot side turbine is increased than before, thereby increasing the total system output.

Alternatively, in the complex supercritical $CO_2$ generation system of the present disclosure, the compressor is added to the bottoming cycle and the additional turbine, the recuperator unit corresponding thereto, and the heater for recovering waste heat are further provided, such that the system output can be improved. Hereinafter, a complex supercritical $CO_2$ generation system according to yet another exemplary embodiment will be described. The detailed description of the same components as those in the above embodiment will not be described again, and the same components are denoted by the same reference numerals but shall be distinguished by a double prime (") symbol.

Figure 8:
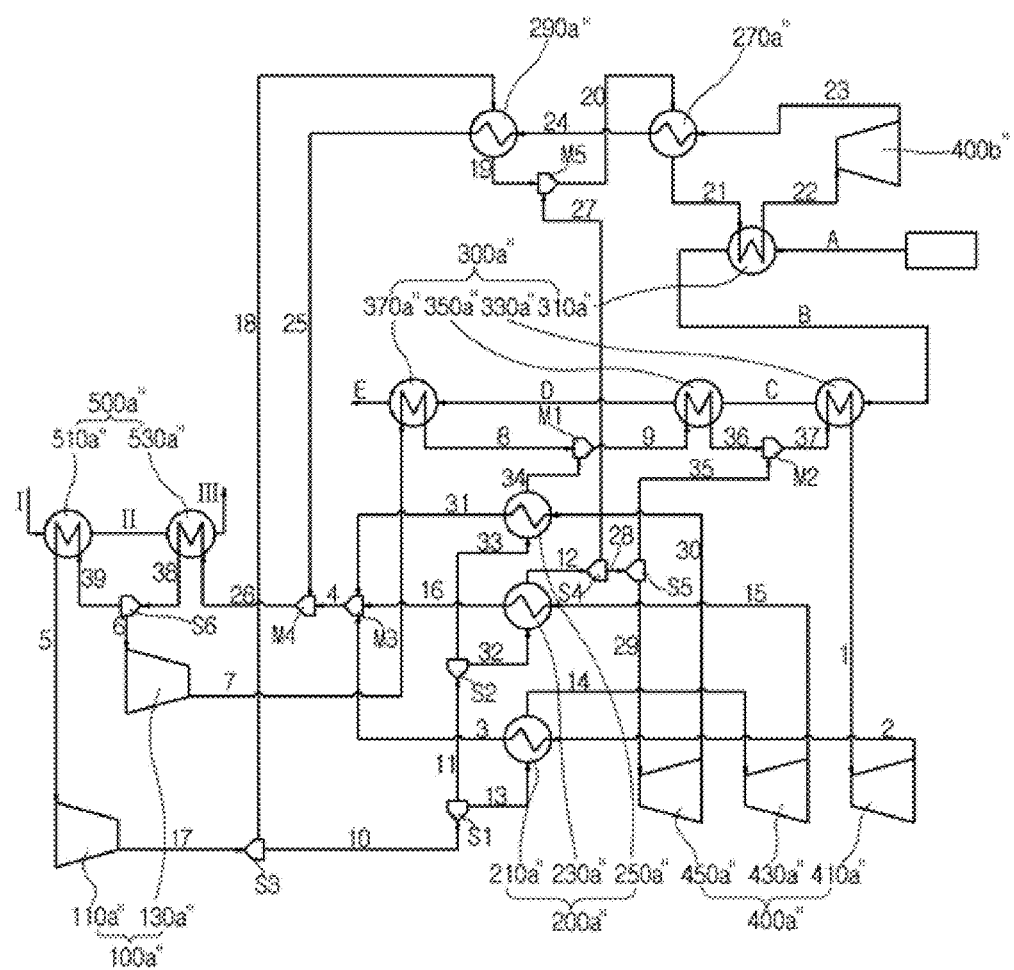
FIG. 8 is a schematic diagram showing a cycle of a complex supercritical $CO_2$ generation system according to yet another exemplary embodiment.

First, the bottoming cycle will be described as follows. FIG. 8 is a schematic diagram showing a cycle of a complex supercritical $CO_2$ generation system according to an exemplary embodiment. As shown in FIG. 8, the generation cycle includes a turbine unit 400a" including three turbines 410a", 430a", and 450" for producing electric power, a pre-cooler unit 500a" including two pre-coolers 510a" and 530a" for cooling a working fluid, and a compressor unit 100a" including two compressors 110a" and 130a" for increasing a pressure of the cooled working fluid, thereby forming a high temperature high-pressure working fluid condition. In addition, three waste heat recovery heat exchangers 330a″, 350a″, and 370a″ of a heat exchanger unit 300a″ for effective waste heat recovery are provided and a recuperator 200a″ including three recuperators 210a″, 230a″, and 250a″ for heat exchange of the working fluid are provided. The waste heat recovery heat exchangers 330a″, 350a″, and 370a″ are provided in series, the recuperators of the recuperator unit 200a″ are provided in parallel, and a plurality of separators and mixers for distributing a flow rate of the working fluid are provided.

The pre-cooler unit 500a″ is configured to include a first pre-cooler 510a″ and a second pre-cooler 530a″, and the compressor unit 100a″ is configured to include a first compressor 110a″ and a second compressor 130a″. The first compressor 110a″ compresses the working fluid cooled by the first pre-cooler 510a″ and the second compressor 130a″ compresses some of the working fluid cooled by the second pre-cooler 530a″. To this end, a separator S6 (hereinafter, referred to as a sixth separator) is provided between the first pre-cooler 510a″ and the second pre-cooler 530a″ to supply the working fluid passing through the second pre-cooler 530a″ to the first pre-cooler 510a″ and the second compressor 130a″.

The recuperator unit 200a″ is configured to include a first recuperator 210a″, a second recuperator 230a″, and a third recuperator 250a″, and the turbine unit 400a″ is configured to include a first turbine 410a″, a second turbine 430a″, and a third turbine 450a″. The working fluid compressed by the first compressor 110a″ is branched and supplied to the first to third recuperators 210a″ to 250a″, respectively, and exchanges heat with a working fluid passing through the turbine unit 400a″ to be recuperated, in which the working fluid passing through the turbine unit 400a″ is cooled. The working fluid recuperated by the first recuperator 210a″ is supplied to the second turbine 430a″. The working fluid recovered by the second recuperator 230a″ is branched and supplied to the third turbine 450a″ and the heat exchanger 330a″, and the working fluid recuperated by the third recuperator 250a″ is branched and supplied to the heat exchanger 350a″.

The heat exchanger unit 300a″ is configured to include a first heater 330″ to a third heater 370a″ and is an external heat exchanger that heats a working fluid using a heat source outside a cycle such as waste heat, along with the high temperature heater of the topping cycle to be described later. The heat exchanger unit 300a″ uses, as a heat source, gas (hereinafter, waste heat gas) having waste heat such as exhaust gas emitted from a boiler of a power plant, and serves to exchange heat between the waste heat gas and the working fluid circulating inside the cycle to heat the working fluid with the heat supplied from the waste heat gas. As the heat exchanger approaches the external heat source, the heat exchange is made at a higher temperature, and as the heat exchanger approaches an outlet end through which the waste heat gas is discharged, the heat exchange is made at a low temperature. The heat exchanger for exchanging heat with the waste heat gas having the highest temperature is a high temperature heater 310a″ to be described later and the heat exchanger for exchanging heat with the waste heat gas having the lowest temperature is the third heater 370a″. That is, the order of closeness to the heat source becomes the high temperature heater 310a″—the first heater 330a″—second heater 350a″—third heater 370a″.

The separators include a first separator S1 to a sixth separator S6, and the mixers include a first mixer M1 to a fifth mixer M5. The first separator S1 is provided at a rear end of the first compressor 110a″, the third separator S3 is provided between the first separator S1 and the first compressor 110a″, and the working fluid branched from the third separator S3 is supplied to the topping cycle and the first separator S1, respectively. At the first separator S1, the working fluid is branched to the first recuperator 210a″ and the second separator S2, and at the second separator S2, the working fluid is branched to the second recuperator 230a″ and the third recuperator 250a″, respectively. The fourth separator S4 is provided at the rear end of the second recuperator 230a″ and the fifth separator S5 is provided to connect between the rear end of the fourth separator S4 and an inlet end of the third turbine 450a″. At the fourth separator S4, the working fluid is branched to the fifth separator S5 and a mixer provided in the topping cycle. The working fluid supplied to the fifth separator S5 branches toward the third turbine 450a″ and the first heater 330a″, respectively. The sixth separator S6 connects between an outlet end of the second pre-cooler 530a″ and an inlet end of the first pre-cooler 510a″, and the working fluid cooled by the second pre-cooler 530a″ is branched to the second compressor 130a″ and the first pre-cooler 510a″.

The first mixer M1 is provided to connect between an outlet end of the third heater 370a″ and an inlet end of the second heater 350a″, and mixes the working fluid heated by the third heater 370a″ with the working fluid recuperated by the third recuperator 250a″. The second mixer M2 is provided to connect between an outlet end of the second heater 350a″ and an inlet end of the first heater 330a″, and mixes the working fluid heated by the second heater 350a″ with the working fluid branched from the fifth separator S5. The third mixer M3 is connected to the outlet ends of the first to third recuperators of the recuperator unit 200a″ and mixes the working fluids cooled by the first to third recuperators of the recuperator unit 200a″ through the turbine unit 400a″. The fourth mixer M4 is provided between an inlet end of the second pre-cooler 530a″ and the third mixer M3, and mixes the working fluid mixed by the third mixer M3 with the working fluid supplied from the topping cycle. The working fluid mixed by the fourth mixer M4 corresponds to the total flow rate of the working fluids of the topping cycle and the bottoming cycle, and the mixed working fluid is supplied to the pre-cooler unit 500a″.

The flow of the working fluid in the generation system having the above-described configuration will be briefly described. The total flow rate at transfer pipe 4 of the working fluid of the bottoming cycle and the total flow rate at transfer pipe 25 of the working fluid of the topping cycle are collected in and mixed by the fourth mixer M4 and then are introduced into the second pre-cooler 530a″ via transfer pipe 26. The working fluid once cooled by the second pre-cooler 530a″ is transmitted to the sixth separator S6 and is branched to the second compressor 130a″ and the first pre-cooler 510a″ via transfer pipes 6 and 39, respectively.

The working fluid re-cooled by the first pre-cooler 510a″ is transmitted to the first compressor 110a″ via transfer pipe 5 and compressed and then supplied to the third separator S3 via transfer pipe 17. Some of the working fluid is branched from the third separator S3 and supplied to the topping cycle via transfer pipe 18, and the rest thereof is supplied to the first separator S1 via transfer pipe 10.

The working fluid is branched from the first separator S1 to the first recuperator 210a″ and the second separator S2 via transfer pipes 13 and 11, respectively, and the working fluid branched to the first recuperator 210a″ via transfer pipe 13 exchanges heat with the working fluid passing through the first turbine 410a″ to absorb heat and to be recuperated. The working fluid recuperated enough to drive the turbine is supplied to the second turbine 430a" via transfer pipe 14 to drive the second turbine 430a". A generator may be coupled to the second turbine 430a" and may be driven by the second turbine 430a" to produce electric power.

The second separator S2 branches the working fluid branched from the first separator S1 via transfer pipe 11 to the second recuperator 230a" and the third recuperator 250a" via transfer pipes 32 and 33, respectively, and the working fluid branched to the second recuperator 230a" via transfer pipe 32 exchanges heat with the working fluid passing through the second turbine 430a" to absorb heat and to be recuperated. The working fluid recuperated by the second recuperator 230a" is supplied to the fourth separator S4 via transfer pipe 12, and some of the working fluid branched from the fourth separator S4 is supplied to the topping cycle via transfer pipe 27 and some thereof is branched to the fifth separator S5 via transfer pipe 28.

Since the fifth separator S5 branches the working fluid to the second mixer M2 and the third turbine 450a" via transfer pipes 35 and 29, respectively, some of the working fluid passing through the second recuperator 230a" is supplied to the third turbine 450a" via transfer pipe 29. In addition, the working fluid branched from the fifth separator S5 to the second mixer M2 via transfer pipe 35 is transmitted to the first heater 330a" via transfer pipe 37.

The working fluid branched from the sixth separator S6 to the second compressor 130a" via transfer pipe 6 is compressed by the second compressor 130a" and then supplied to the third heater 370a" via transfer pipe 7. The temperature of the working fluid is higher than the case in which the working fluid passes through the second pre-cooler 530a" while being compressed by the second compressor 130a". For example, if the working fluid passing through the second pre-cooler 530a" is a low-temperature, low-pressure working fluid, then the working fluid may be in a mid-temperature, high pressure state after passing through the second compressor 130a". Since the working fluid whose temperature rises by the compression is supplied to the third heater 370a", the temperature of the working fluid via transfer pipe 7 introduced into the third heater 370a" may be higher than before.

The working fluid transmitted to the third heater 370a" via transfer pipe 7 exchanges heat with the waste heat gas to be primarily heated and is then transmitted to the first mixer M1 via transfer pipe 8, and is mixed with the working fluid recuperated by the third recuperator 250a" and then supplied to the second heater 350a" via transfer pipe 9. The working fluid secondarily heated by exchanging heat with the waste heat gas by the second heater 350a" is transmitted to the second mixer M2 via transfer pipe 36, mixed with the working fluid branched from the fifth separator S5, and then transmitted to the first heater 330a" via transfer pipe 37. The working fluid tertiarily heated by exchanging heat with waste heat gas by the first heater 330a" is transmitted to the first turbine 410a" via transfer pipe 1 to drive the first turbine 410a". A generator may be coupled to the first turbine 410a" and may be driven by the first turbine 410a" to produce electric power.

The working fluid expanded after the plurality of turbines of the turbine unit 400a" are driven is transmitted to the recuperator unit 200a" and cooled, in which the working fluid passing through the first turbine 410a" is transmitted to the first recuperator 210a" via transfer pipe 2, the working fluid passing through the second turbine 430a" is transmitted to the second recuperator 230a" via transfer pipe 15, and the working fluid passing through the third turbine 450a" is transmitted to the third recuperator 250a" via transfer pipe 30.

In each recuperator of the recuperator unit 200a", the working fluid compressed by passing through the first compressor 110a" and the working fluid passing through the turbine unit 400a" exchange heat with each other, and thus the working fluid passing through the turbine unit 400a" is cooled and then collected in and mixed by the third mixer M3 via transfer pipes 3, 16, and 31. The working fluid mixed by the third mixer M3 is transmitted to the fourth mixer M4 via transfer pipe 4 and mixed with the working fluid transmitted from the topping cycle via transfer pipe 25 to be supplied to the second pre-cooler 530a" via transfer pipe 26. The flow rate of the working fluid mixed by the fourth mixer M4 becomes the total flow rate of the bottoming cycle and the topping cycle.

Hereinafter, the topping cycle constructed by combining with the bottoming cycle will be described. The topping cycle of the present disclosure is configured to include fourth recuperator 270a" and fifth recuperator 290a", the high temperature heater 310a" for recovering waste heat from an external heat source, and a fourth turbine 400b".

Describing with reference to the flow of the working fluid, some of the working fluid of the bottoming cycle is supplied to the fifth recuperator 290a" through the third separator S3 via transfer pipe 18. The working fluid is recuperated by the fifth recuperator 290a" and then transmitted to the fifth mixer M5 via transfer pipe 19. The fifth mixer M5 mixes the working fluid recuperated by the fifth recuperator 290a" with the working fluid branched from the fourth separator S4 and supplies the mixed working fluid to the fourth recuperator 270a" via transfer pipe 20. The working fluid is recuperated by the fourth recuperator 270a", supplied to the high temperature heater 310a" via transfer pipe 21, and then reheated.

The high temperature heater 310a" absorbs heat from the waste heat gas and exchanges heat with the working fluid via transfer pipe A and is disposed closest to the external heat source. High temperature waste heat gas is used. After the waste heat gas is primarily absorbed by the high temperature heater 310a" and thus the temperature thereof is reduced, the waste heat gas is sequentially supplied to the first heater 330a" to the third heater 370a" within the bottoming cycle as described above via transfer pipes B, C, and D. In the viewpoint of the waste heat recovery heater, two cycles are connected in series.

The working fluid sufficiently heated by the high temperature heater 310a" is supplied to the fourth turbine 400b" to drive the fourth turbine 400b" via transfer pipe 22 and an additional generator (not shown) may be connected to the fourth turbine 400b". The working fluid expanded by passing through the fourth turbine 400b" is supplied to the fourth recuperator 270a" via transfer pipe 23 and exchanges heat with the working fluid passing through the fifth mixer M5 to be cooled. Thereafter, the working fluid is supplied to the fifth recuperator 290a" via transfer pipe 24 and exchanges heat with the working fluid branched from the third separator S3 to be cooled, and then transmitted to the fourth mixer M4 via transfer pipe 25. The fourth mixer M4 configures a complex generation cycle in which the working fluid of the bottoming cycle and the working fluid of the topping cycle are mixed with each other and circulated back to the second pre-cooler 530a".

In the complex supercritical $CO_2$ generation system according to the exemplary embodiment having the above-described configuration, the comparison results of the complex generation cycle of the present disclosure shown in FIG. 8 with the existing cycle shown in FIG. 1 are as follows.

Figure 9:
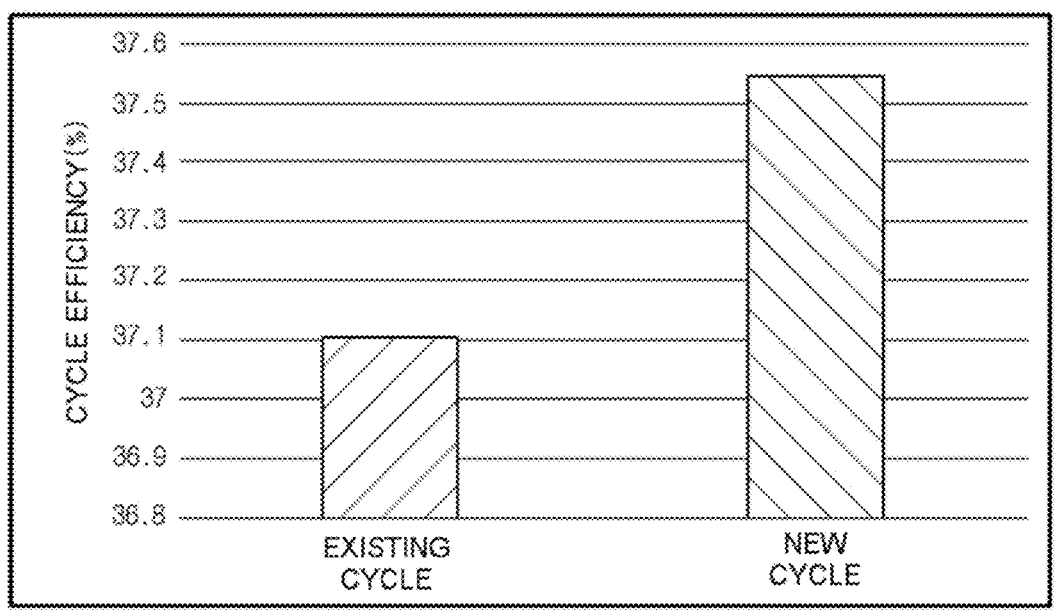
FIG. 9 is a graph showing the generation efficiency of the existing parallel recuperation cycle and the complex generation cycle of the present disclosure.

FIG. 9 is a graph showing the generation efficiency of the existing parallel recuperation cycle and the complex generation cycle of the present disclosure. The comparison is made in a state in which a total heat input of the waste heat recovery heater is fixed. As shown in FIG. 9, as compared with the total efficiency of the existing cycle, it can be seen that the generation efficiency of the complex generation cycle of the present invention is increased by about 0.44%. This means that a cycle having a high output can be designed under the same heat source conditions.

As described above, the compressor is further configured in the bottoming cycle and only the discharged flow rate is introduced into the low temperature side inlet of the low temperature heater recovering waste heat to increase the heat exchange efficiency of the low temperature heater, thereby increasing the efficiency of the whole cycle. Further, the additional turbine, the recuperator corresponding thereto, and the heater recovering the waste heat are further provided in the bottoming cycle to increase the heat exchange efficiency of the heater of the bottoming cycle, thereby increasing the efficiency of the whole cycle.

The complex supercritical $CO_2$ generation system according to the exemplary embodiment configures the complex generation system of the bottoming cycle and the topping cycle, branches flow rates of the cold side outlets of the recuperators of the bottoming cycle provided in parallel and supplies them to the recuperators of the topping cycle provided in series, thereby increasing the heat exchange efficiency of the topping cycle. Therefore, it is possible to increase the efficiency of the whole cycle.

In addition, the cycle is configured so that the highest temperature portion of the external heat source is used in the recompression cycle and then the heat source discharged in the low temperature state is used in the existing parallel recuperation generation system. Thus, the highest inlet temperature of the hot side turbine is increased than before, thereby increasing the total system output.

The various embodiments described as above and shown in the drawings, should not be interpreted as limiting the technical spirit of the present invention. The scope of the present disclosure is limited only by matters set forth in the claims and those skilled in the art can modify and change the technical subjects of the present invention in various forms.

What is claimed is:

1. A complex supercritical $CO_2$ generation system, comprising:
 a bottoming cycle including
  a compressor that compresses a working fluid,
  a lower heat exchanger unit having a plurality of heat exchangers that are supplied with heat from an external heat source to heat the working fluid,
  a lower turbine unit having a plurality of turbines that are driven by the working fluid,
  a lower recuperator unit having a plurality of recuperators that are installed in parallel to each other and exchange heat between the working fluid having passed through the lower turbine unit and the working fluid having passed through the compressor to cool the working fluid having passed through the lower turbine unit, and
  a pre-cooler that cools the working fluid primarily cooled by the lower recuperator unit and supplies the pre-cooled working fluid to the compressor; and
 a topping cycle including
  an upper heat exchanger unit that is supplied with the heat from the external heat source to heat the working fluid,
  an upper turbine unit that is driven by the working fluid, and
  an upper recuperator unit having a plurality of recuperators that are installed in series with each other and exchange heat between the working fluid having passed through the upper turbine unit and the working fluid supplied from the bottoming cycle to cool the working fluid having passed through the upper turbine unit, the working fluid cooled by the upper recuperator unit being supplied to the bottoming cycle,
 wherein the bottoming cycle and the topping cycle share the compressor and the pre-cooler of the bottoming cycle.

2. The complex supercritical $CO_2$ generation system of claim 1, wherein the bottoming cycle branches the working fluid at a downstream end of the compressor and supplies the branched working fluid to the topping cycle and the topping cycle recuperates the working fluid branched from the bottoming cycle using the upper recuperator unit and then supplies the recuperated working fluid to the upper turbine unit.

3. The complex supercritical $CO_2$ generation system of claim 2, wherein some of the working fluid recuperated by a cold side recuperator among the recuperators of the lower recuperator unit in the bottoming cycle is branched and supplied to the topping cycle, and the topping cycle recuperates the working fluid branched from the bottoming cycle using a cold side recuperator among the recuperators of the upper recuperator unit, mixes the recuperated working fluid with the working fluid supplied from the cold side recuperator of the bottoming cycle to the topping cycle, and supplies the mixed working fluid to a hot side recuperator among the recuperators of the upper recuperator unit.

4. The complex supercritical $CO_2$ generation system of claim 3, wherein the working fluid supplied to the hot side recuperator through the cold side recuperator of the topping cycle is recuperated by the hot side recuperator, reheated by a high temperature heater, and then supplied to the upper turbine unit, and the working fluid expanded by passing through the upper turbine unit is cooled by sequentially passing through the hot side recuperator and the cold side recuperator of the upper recuperator unit and then supplied to an upstream end of the pre-cooler of the bottoming cycle.

5. The complex supercritical $CO_2$ generation system of claim 4, wherein the lower heat exchanger unit of the bottoming cycle includes a low temperature heater and a mid-temperature heater that exchange heat with low temperature and mid-temperature waste heat gases, the upper heat exchanger unit of the topping cycle includes the high temperature heater that exchanges heat with high temperature waste heat gas, and the waste heat gas sequentially passes through the high temperature heater, the mid-temperature heater, and the low temperature heater.

6. The complex supercritical $CO_2$ generation system of claim 5, wherein the bottoming cycle further includes a first separator that branches the working fluid compressed by the compressor to the low temperature heater and the lower recuperator unit, respectively, a second separator that branches the working fluid branched to the lower recuperator unit to a hot side recuperator and a cold side recuperator, respectively, among the plurality of recuperators of the lower recuperator unit, and a third separator that is provided between the first separator and the compressor to branch the working fluid compressed by the compressor to the topping cycle and the first separator, respectively.

7. The complex supercritical $CO_2$ generation system of claim 6, wherein the lower turbine unit of the bottoming cycle includes a first turbine and a second turbine, the working fluid recuperated by the hot side recuperator of the lower recuperator unit is supplied to the second turbine, some of the working fluid recuperated by the cold side recuperator of the lower recuperator unit is supplied to the topping cycle and some thereof is branched to be supplied to the mid-temperature heater, the working fluid branched to the mid-temperature heater is mixed with the working fluid heated by the low temperature heater to be supplied to the mid-temperature heater, and the working fluid supplied to the mid-temperature heater is heated by the mid-temperature heater and then supplied to the first turbine.

8. The complex supercritical $CO_2$ generation system of claim 2, wherein the working fluid supplied to a hot side recuperator through a cold side recuperator of the topping cycle is recuperated by the hot side recuperator, reheated by the upper heat exchanger unit, and then supplied to the upper turbine unit, and the working fluid expanded by passing through the upper turbine unit is cooled by sequentially passing through the hot side recuperator and the cold side recuperator and then supplied to an upstream end of the pre-cooler of the bottoming cycle.

9. The complex supercritical $CO_2$ generation system of claim 8, wherein the topping cycle further includes a separator that branches some of the working fluid cooled by sequentially passing through the hot side recuperator and the cold side recuperator, a second compressor that compresses the working fluid branched from the separator, and a mixer that is provided at a downstream end of the second compressor and the working fluid branched from the bottoming cycle and supplied to the cold side recuperator of the topping cycle and the working fluid having passed through the second compressor are mixed with each other by the mixer of the topping cycle to be supplied to the hot side recuperator.

10. The complex supercritical $CO_2$ generation system of claim 9, wherein the lower heat exchanger unit of the bottoming cycle includes a low temperature heater and a mid-temperature heater that exchange heat with low temperature and mid-temperature waste heat gases, the upper heat exchanger unit of the topping cycle includes a high temperature heater that exchanges heat with high temperature waste heat gas, and the waste heat gas sequentially passes through the high temperature heater, the mid-temperature heater, and the low temperature heater.

11. The complex supercritical $CO_2$ generation system of claim 10, wherein the bottoming cycle further includes a first separator that branches the working fluid compressed by the compressor to the low temperature heater and the lower recuperator unit, respectively, a second separator that branches the working fluid branched to the lower recuperator unit to a hot side recuperator and a cold side recuperator, respectively, among the recuperators of the lower recuperator unit, and a third separator that is provided between the first separator and the compressor to branch the working fluid compressed by the compressor to the topping cycle and the first separator, respectively.

12. The complex supercritical $CO_2$ generation system of claim 11, wherein the lower turbine unit of the bottoming cycle includes a first turbine and a second turbine, the working fluid recuperated by the hot side recuperator of the lower recuperator unit is supplied to the second turbine, the working fluid branched to the mid-temperature heater is mixed with the working fluid heated by the low temperature heater to be supplied to the mid-temperature heater, and the working fluid supplied to the mid-temperature heater is heated by the mid-temperature heater and then supplied to the first turbine.

13. The complex supercritical $CO_2$ generation system of claim 12, wherein the working fluids expanded by passing through the first and second turbines are cooled by the hot side and cold side recuperators of the lower recuperator unit, respectively, and the working fluids cooled by the hot side and cold side recuperators of the lower recuperator unit are mixed with the working fluid supplied from the topping cycle to be supplied to the pre-cooler.

14. A complex supercritical $CO_2$ generation system, comprising:
a bottoming cycle including
a compressor unit having a plurality of compressors that compress a working fluid,
a lower heat exchanger unit having a plurality of heat exchangers that are supplied with heat from an external heat source to heat the working fluid,
a lower turbine unit having a plurality of turbines that are driven by the working fluid,
a lower recuperator unit having a plurality of recuperators that are installed in parallel to each other and exchange heat between the working fluid having passed through the lower turbine unit and the working fluid having passed through the compressor to cool the working fluid having passed through the lower turbine unit, and
a pre-cooler unit having a plurality of pre-coolers that cool the working fluid primarily cooled by the lower recuperator unit and supply the pre-cooled working fluid to the compressor; and
a topping cycle including
an upper heat exchanger unit that is supplied with the heat from the external heat source to heat the working fluid,
an upper turbine unit that is driven by the working fluid, and
an upper recuperator unit having a plurality of recuperators that are installed in series with each other and exchange heat between the working fluid having passed through the upper turbine unit and the working fluid supplied from the bottoming cycle to cool the working fluid having passed through the upper turbine unit, the working fluid cooled by the upper recuperator unit being supplied to the bottoming cycle,
wherein the bottoming cycle and the topping cycle share the compressor and the pre-cooler of the bottoming cycle.

15. The complex supercritical $CO_2$ generation system of claim 14, wherein the bottoming cycle branches the working fluid at a downstream end of a first compressor of the compressor unit and supplies the branched working fluid to the topping cycle, the topping cycle recuperates the working fluid branched from the bottoming cycle using the upper recuperator unit and then supplies the recuperated working fluid to the upper turbine unit, the lower heat exchanger unit of the bottoming cycle includes first to third heaters that exchange heat with low temperature and mid-temperature waste heat gases, the upper heat exchanger unit of the topping cycle includes a high temperature heater that exchanges heat with high temperature waste heat gas, and the waste heat gas sequentially passes through the high temperature heater and the first to third heaters.

16. The complex supercritical $CO_2$ generation system of claim 15, wherein the topping cycle further includes a mixer to which some of the working fluid branched from one of the recuperators of the lower recuperator unit in the bottoming cycle is supplied, the working fluid branched to the mixer is mixed with the working fluid recuperated by a cold side recuperator of the recuperators of the topping cycle, recuperated by a hot side recuperator among the recuperators of the topping cycle, reheated by the high temperature heater, and then supplied to the upper turbine unit, and the topping cycle sequentially passes the working fluid, which is expanded by passing through the upper turbine unit, through the hot side recuperator and the cold side recuperator of the upper recuperator unit and cools the working fluid and then supplies the cooled working fluid to an upstream end of the pre-cooler unit of the bottoming cycle.

17. The complex supercritical $CO_2$ generation system of claim 16, wherein the compressor unit of the bottoming cycle further includes a second compressor, the pre-cooler unit includes a first pre-cooler and a second pre-cooler, the working fluid supplied from the topping cycle is mixed by a mixer provided at a downstream end of the second pre-cooler to be supplied to the second pre-cooler, and the working fluid branched at a discharge end of the second pre-cooler is supplied to the first pre-cooler and the second compressor.

18. The complex supercritical $CO_2$ generation system of claim 17, wherein the lower recuperator unit of the bottoming cycle includes first to third recuperators, the working fluid compressed by the second compressor is supplied to the third heater, the working fluid heated by the third heater is mixed with the working fluid recuperated by the third recuperator to be supplied to the second heater, and the working fluid heated by the second heater is mixed with some of the working fluid recuperated by the second recuperator to be supplied to the first heater and then heated by the first heater to be supplied to a hot side turbine among the turbines in the lower turbine unit.

19. The complex supercritical $CO_2$ generation system of claim 18, wherein the bottoming cycle further includes a first separator that branches the working fluid compressed by the first compressor to the first recuperator and the second recuperator, respectively, a second separator that branches the working fluid branched to the second recuperator to the second recuperator and the third recuperator, respectively, and a third separator that is provided between the first separator and the first compressor to branch the working fluid having passed through the first compressor to the topping cycle and the first separator, respectively.

20. The complex supercritical $CO_2$ generation system of claim 19, wherein the lower turbine unit of the bottoming cycle includes first to third turbines, the working fluid recuperated by the first recuperator of the lower recuperator unit is supplied to the second turbine, some of the working fluid recuperated by the second recuperator of the lower recuperator unit is supplied to the topping cycle and some thereof is branched to be supplied to the first heater and the third turbine, respectively, the working fluid recuperated by the third recuperator of the lower recuperator unit is supplied to the second heater to be mixed with the working fluid having passed through the third heater, and the working fluids expanded by passing through the first to third turbines are cooled by the first to third recuperators, respectively, and mixed with each other with the working fluid supplied from the topping cycle to be supplied to the second pre-cooler.

* * * * *